United States Patent Office

3,563,736
Patented Feb. 16, 1971

3,563,736
PHOTOCONDUCTIVE COATINGS
Frank T. Koehler, Jr., Plainfield, and Albert L. Micchelli, Middletown, N.J., assignors to National Starch and Chemical Corporation, New York, N.Y., a corporation of Delaware
No Drawing. Filed Feb. 12, 1968, Ser. No. 704,569
Int. Cl. G03g 5/08
U.S. Cl. 96—1.8
8 Claims

ABSTRACT OF THE DISCLOSURE

A photoconductive coating for application to a solid substrate which is to be utilized in electrophotographic operations, said coating comprising a layer of zinc oxide pigment bonded with a copolymer of vinyl acetate and a substituted or unsubstituted mono-ester of maleic acid.

---

In the known electrophotographic processes, a solid substrate which has been coated with a photoconductive surface is electrostatically charged in the absence of light. The charged surface is then exposed to a light source, such as actinic-radiation reflected from a printed surface or transmitted through a transparency, which serves to discharge the exposed area while having no effect upon the charge on the unexposed areas which is thus retained in the form of an electrostatic image. The exposed areas are then contacted with an electrostatically charged marking powder or dispersion which clings to the charged areas but does not adhere to the uncharged, i.e., exposed, areas. The visible image which is thus formed may then be transferred to another surface resulting in a positive or negative print, or, if desired, it may be fused in order to fix the image directly to the solid substrate itself.

It is thus evident that the proper selection of a photoconductive system is essential for a successful electrophotographic operation. Among the properties that must be exhibited by such photoconductive materials are included: the ability to accept an electrostatic charge; the ability to hold the charge for a period of time in the absence of light without exhibiting a rapid rate of charge decay; the ability to provide the fixed or developed sheets with excellent print density; the ability to provide an efficient dispersing medium for the pigment particles; inertness of the binder toward the pigment which is being utilized; and, the ability to be readily coated on a solid substrate.

A frequently utilized photoconductive system comprises the combination of a zinc oxide pigment and a polyvinyl acetate homopolymer binder. This system, however, does not exhibit the aforementioned properties to an optimum level.

It is, thus, the object of this invention to provide a photoconductive system which has the ability to accept and retain an electrostatic charge for a period of time which is sufficient to permit visible development and fixation of an electrostatically formed image and which is, therefore, readily applicable for use in electrophotographic operations. It is a further object to prepare base plates for use in electrophotographic operations by coating the latter photoconductive systems onto applicable solid substrates. Various other objects and advantages of this invention will be apparent from the following description thereof.

We have now found that all of the previously described requirements for an effective photoconductive system are realized by utilizing a photoconductive system which comprises a zinc oxide pigment bonded with a copolymer of vinyl acetate and a substituted or unsubstituted mono-ester of maleic acid, i.e., an ester of maleic acid wherein only one of the carboxyl groups thereof has been esterified. Particularly significant is the high charge acceptance and the low dark decay rate exhibited by these systems. Thus, solid substrates which have been coated with the latter materials will accept and hold an electrostatic charge in the absence of light and, upon being exposed to a light image, will release the charge from the exposed areas but will retain the charge on the unexposed areas for a period of time sufficient to permit visible development of the electrostatic image formed by the unexposed areas. Furthermore, these photoconductive systems are readily coated onto a variety of solid substrates. They also provide the resulting printed sheet with excellent density, i.e., with excellent definition of the visible image.

The polymeric material which is utilized in conjunction with the zinc oxide pigment serves to bind the photoconductive zinc oxide particles and thereby places them in a relationship with one another such that the particles are rendered conductive in the areas where the light radiation strikes the coating. The novel binders of this invention are, as noted earlier, the copolymers of vinyl acetate and at least one monoester of maleic acid selected from the group consisting of monoalkyl maleate esters containing from 1 to 10 carbon atoms in the alkyl radicals thereof and mono-aryl maleate esters. In addition, mono-esters of maleic acid containing substituted alkyl or substituted aryl radicals are also applicable for use in the process of this invention; typical groups which may thus be substituted on the aryl or alkyl radicals including cyano, halogen and ether radicals. Thus, for purposes of this disclosure, it is to be understood that the term "mono-alkyl maleate esters" and "mono-aryl maleate esters" are each meant to encompass, within their scope, both the substituted and unsubstituted varieties thereof.

It is well known in the art that the latter maleate ester monomers may be prepared by reacting maleic anhydride with either a substituted or unsubstituted alcohol. Specific examples of such maleate ester monomers include: mono-ethyl maleate, mono-butyl maleate, mono-cyanoethyl maleate, mono-chloromethyl maleate, mono-tetrahydrofurfuryl maleate, mono-benzyl maleate and mono-cyclohexyl maleate, etc.

In addition, other monomers may, if desired, be optionally included in the preparation of the polymeric binders of this invention. Included among such optional monomers are the substituted alkyl acrylates and methacrylates containing from 1 to 8 carbon atoms in their respective alkyl radicals such, for example, as ethyl acrylate, butyl methacrylate, 2-ethyl hexyl acrylate and cyanoethyl acrylate; dialkyl maleates and fumarates containing from 1 to 9 carbon atoms in their respective alkyl radicals such, for example, as diethyl maleate, dibutyl fumarate, dioctyl maleate and dinonyl maleate; vinyl esters wherein the acid derived radical thereof contains from 2 to 17 carbon atoms such, for example, as vinyl stearate; and, vinyl esters of alpha-branched saturated aliphatic mono-carboxylic acids such, for example, as vinyl pivalate, etc.

The critical concentration in the polymeric binders of this invention is that of the mono-ester of maleic acid.

Thus, in order to achieve the various properties whose presence is required in the ultimate photoconductive coating, the copolymer binder must contain from about 1.4 to 20%, by weight, of moieties derived from a monoester of maleic acid. With regard to the other monomeric ingredients of the binder, it is merely necessary that a minimum of about 10%, by weight, of moieties derived from vinyl acetate be present therein.

It should be noted that the latter copolymeric binders may be prepared by means of free-radical initiated polymerization techniques well known to those skilled in the polymer art. Thus, they may be directly prepared in the form of organic solvent solutions, i.e., as lacquers; in aqueous emulsion form; in aqueous solution form; or, as solid pearls or beadlets which result from a suspension polymerization process. However, the preparation of these copolymers in the form of organic solvent solutions is preferred since, as will be described hereinbelow, they will ordinarily be utilized in the latter form for the actual preparation of the photoconductive systems of this invention.

The actual preparation of the novel photoconductive systems of this invention may be accomplished merely by admixing and dispersing the zinc oxide pigment within an organic solvent solution of the polymeric binder and, thereafter, finely grinding the resulting blend to a particle size of from about 4 to 6 on the Hegman scale. Additional solvent may be added, prior to grinding, in order to attain the desired solids content. Organic solvents such as toluene, xylene, ethyl acetate and methyl ethyl ketone are ordinarily utilized in preparing these photoconductive systems. It should be noted, however, that water can be used as the vehicle or solvent in those instances where it is desired to prepare the final composition in emulsion form or where a water soluble binder is being used, e.g., a copolymer derived solely from vinyl acetate and a mono-alkyl maleate ester. The preparation is generally completed by incorporating a sensitizer dye or dye mixture into the blend in a concentration ranging from about 0.02 to 0.05%, based on the weight of zinc oxide; the latter sensitizers including, for example, Fluorescein, Rose Bengal and methylene blue. The addition of the latter sensitizers may, however, be obviated if the resulting photoconductive systems are to me utilized in a procedure whereby the light or energy source is itself capable of causing a conductive response in the zinc oxide pigment.

With respect to the relative concentration of the pigment and binder solids, ratios ranging from about 2:1 to 12:1 of pigment solids to binder solids are applicable for use in the novel systems of this invention.

Optional additives may be incorporated into these novel photoconductive systems in order to modify certain properties thereof. Among such additives are included: plasticizers such as dialkyl phthalates; brighteners such as titanium dioxide; silicones; and, other modifying resins such as alkyd resins, etc.

Our novel systems may be coated onto a wide variety of solid substrates such, for example, as paper, paperboard, fabrics made from natural and synthetic fibers, metallic coated paper, metallic foils, and synthetic resin-based films such as polyethylene terephthalate, polyethylene, polypropylene, polyvinyl chloride and cellulose acetate, the latter resin-based films having been rendered conductive or semi-conductive. The actual application of these photoconductive systems to the selected substrate may be accomplished by the use of any technique which is capable of depositing a continuous film on the surface thereof. Thus, among the various methods of application which may be utilized, one may list wire wound and grooved rod applicators, as well as air knife, trailing blade, gravure, reverse and direct roll coaters. Typical coating weights may range from about 8 to 30 pounds per 3000 square feet of substrate.

Following their application, the photoconductive systems are dried by any convenient means as, for example, by the use of forced air oven drying, infrared or radiant heat drying. Here again, such drying methods are well known and the practioner may employ the drying means best suited to his particular needs in light of the equipment which is available.

In order to demonstrate the excellent photoconductive properties exhibited by the systems of this invention, the tests described hereinbelow may be used. In each instance, the tests were conducted in an environment wherein the relative humidity was at a level of 55%.

Charge acceptance

The selected photoconductive system is coated onto a paper substrate in a coating weight of 18 pounds per 3000 square feet of paper and then dried. Thereafter, the coated paper is conditioned, in the absence of light, for a period of 24 hours whereupon it is exposed, while still in the dark, to an electrostatic charging unit for a period of 7 seconds. The surface charge which is thus imparted to the coated paper is then measured by means of an electrostatic probe.

Dark decay rate

Continuing the procedure of the "Charge Acceptance" test, immediately after removing the charging unit and measuring the deposited surface charge, the electrostatic probe is utilized to measure the rate at which the charge dissipates from the surface of the coated paper. Needless to say, photoconductive systems which, in the absence of light, exhibit a slow charge decay rate are preferred for use in electrophotographic operations.

The following examples will more fully illustrate the embodiment of this invention. In these examples all parts given are by weight unless otherwise noted.

EXAMPLE I

This example illustrates the preparation of a typical photoconductive system of this invention as well as the excellent properties resulting from the use thereof.

Thus, 32 parts of zinc oxide, 50 parts of toluene and 8 parts of a 50%, by weight, toluene solution of a 96.6:3.4 vinyl acetate:mono-2-cyanoethyl maleate copolymer were admixed and subject to grinding in a porcelain ball mill for a period of 4 hours; the latter being the time required to obtain a reasonably fine grind, i.e., 4 to 5 units on the Hegman scale. Thereafter, 0.05 part of a sensitizer mix containing equal parts of Rose Bengal, Fluorescein and methylene blue were intimately dispersed in the mix.

The resulting photoconductive system, which had a total solids content of 40%, by weight, was then subjected to the "Charge Acceptance" and "Dark Decay Rate" tests wherein it exhibited a 400-volt charge acceptance and a 5-volt/second dark decay rate. The resulting data clearly indicates that the photoconductive system, whose preparation was described hereinabove, had the capability of accepting a substantial surface charge and of retaining the thus accepted charge for a period of time sufficient to develop and fix an image created thereon.

Furthermore, it is to be noted that upon using the above described photoconductive system in an actual electrophotographic operation, a clear, well-defined image was formed on the coated paper substrate.

EXAMPLE II

This example illustrates the preparation of additional photoconductive systems of this invention as well as the excellent properties resulting from the use thereof.

The photoconductive formulations described in the following table were prepared by means of the procedure set forth in Example I, hereinabove.

| Ingredients | Formulation No., parts | | | | |
| --- | --- | --- | --- | --- | --- |
| | 1 | 2 | 3 | 4 | 5 |
| A 50%, by weight, toluene solution of a 96.1:2.9 vinyl acetate:mono-ethyl maleate copolymer | 12.0 | 24.0 | | | |
| A 50%, by weight, toluene solution of a 96.1:2.9 vinyl acetate:mono-cyanoethyl maleate copolymer | | | 12.0 | | |
| A 50%, by weight, methyl ethyl ketone solution of a 80:20 vinyl acetate:cyclohexyl maleate copolymer | | | | 10.0 | |
| A 50%, by weight, methyl ethyl ketone solution of a 90:10 vinyl acetate:mono-benzyl maleate copolymer | | | | | 10.0 |
| Zinc oxide | 48.0 | 48.0 | 48.0 | 40.0 | 40.0 |
| Toluene | 40.0 | 28.0 | 40.0 | 50.0 | 50.0 |
| A sensitizer mix containing equal parts of Rose Bengal, Fluorescein and methylene blue | 0.02 | 0.03 | 0.02 | 0.02 | 0.02 |
| Total solids content of system (percent, by wt.) | 54 | 60 | 54 | 45 | 45 |

Upon subjecting the resulting products to the "Charge Acceptance" and "Dark Decay Rate" tests described hereinabove, the following results were obtained:

| | Charge Acceptance (volts) | Dark Decay Rate, (volts/sec.) |
| --- | --- | --- |
| Formulation No.: | | |
| 1 | 400 | 5.0 |
| 2 | 375 | 4.5 |
| 3 | 375 | 5.0 |
| 4 | 300 | 6.0 |
| 5 | 330 | 2.0 |

The results summarized above clearly indicate the excellent photoconductive properties exhibited by the novel systems of this invention.

In addition, a similar preparative procedure was utilized to prepare a photoconductive system based on a terpolymer binder, the latter system containing 6.0 parts of a 50%, by weight, toluene solution of a 82:3.5:14.5 vinyl acetate:mono-ethyl maleate:ethyl acrylate terpolymer; 36 parts of zinc oxide; 59 parts of toluene; and, 0.04 part of a sensitizer mix containing equal parts of Rose Bengal, Fluorescein and methylene blue. The resulting photoconductive system, which had a total solids content of 39%, by weight, exhibited photoconductive properties which were comparable to those of the previously described systems.

Summarizing, it is thus seen that this invention provides a novel class of photoconductive systems which are especially suited for use in electrophotographic operations.

Variations may be made in procedures, proportions and materials without departing from the scope of this invention which is defined by the following claims.

We claim:

1. A photoconductive coating composition which comprises a blend of a finely-divided, photoconductive zinc oxide pigment and a binder therefor comprising a solution of a copolymer of vinyl acetate and at least one mono-ester of maleic acid selected from the group consisting of mono-alkyl maleate esters containing from 1 to 10 carbon atoms in the alkyl radicals thereof and mono-aryl maleate esters, wherein said copolymer contains at least about 10%, by weight, of vinyl acetate and from about 1.4 to 20%, by weight, of said mono-ester of maleic acid; said zinc oxide pigment being dispersed in said copolymer solution.

2. The coating composition of claim 1, wherein the ratio of pigment solids to binder solids ranges from about 2:1 to 12:1, by weight.

3. The coating composition of claim 1 in which there is also present from about 0.02% to 0.05% of at least one sensitizer dye, as based on the weight of zinc oxide pigment therein.

4. The coating composition of claim 1, wherein said copolymer contains at least one additional monomer selected from the group consisting of substituted and unsubstituted alkyl acrylates and methacrylates containing from 1 to 8 carbon atoms in the alkyl radicals thereof; dialkyl maleates and fumarates containing from 1 to 9 carbon atoms in the alkyl radicals thereof; vinyl esters wherein the acid derived radical thereof contains from 2 to 17 carbon atoms; and, vinyl esters of alpha-branched saturated aliphatic monocarboxylic acids.

5. An assembly suitable for use in electrophotographic operations, said assembly comprising a solid substrate coated on at least one surface thereof with a photoconductive coating comprising a finely-divided, photoconductive zinc oxide pigment which is bound to said substrate by means of an interspersed dried residue of a solution of a copolymer of vinyl acetate and at least one mono-ester of maleic acid selected from the group consisting of mono-alkyl maleate esters containing from 1 to 10 carbon atoms in the alkyl radicals thereof and mono-aryl maleate esters, wherein said copolymer contains at least about 10%, by weight, of vinyl acetate and from about 1.4 to 20%, by weight, of said mono-ester of maleic acid.

6. The assembly of claim 5, wherein the ratio of pigment solids to binder solids in said photoconductive coating ranges from about 2:1 to 12:1, by weight.

7. The assembly of claim 5, wherein said photoconductive coating also contains dispersed therein from about 0.02 to 0.05% of at least one sensitizer dye, as based on the weight of zinc oxide pigment in said coating.

8. The assembly of claim 5, wherein said copolymer contains at least one additional monomer selected from the group consisting of substituted and unsubstituted alkyl acrylates and methacrylates containing from 1 to 8 carbon atoms in the alkyl radicals thereof; dialkyl maleates and fumarates containing from 1 to 9 carbon atoms in the alkyl radicals thereof; vinyl esters wherein the acid derived radical thereof contains from 2 to 17 carbon atoms; and, vinyl esters of alpha-branched saturated aliphatic monocarboxylic acids.

References Cited

UNITED STATES PATENTS

| 2,047,398 | 7/1936 | Voss et al. | 260—78.5X |
| 2,637,712 | 5/1953 | Upton | 260—78.5X |
| 2,643,246 | 6/1953 | Wilson | 260—78.5 |
| 2,979,402 | 4/1961 | Greig | 96—1.8 |
| 3,121,006 | 2/1964 | Middleton et al. | 96—1.5 |
| 3,148,982 | 9/1964 | Ghys | 252—501X |
| 3,197,307 | 7/1965 | Blake et al. | 96—1.8 |
| 3,245,786 | 4/1966 | Cassiers et al. | 96—1.8 |
| 3,251,687 | 5/1966 | Fohl et al. | 96—1.7 |
| 3,404,979 | 10/1968 | Bonjour | 96—1.8 |
| 3,406,221 | 10/1968 | Wright et al. | 260—78.5X |

CHARLES E. VAN HORN, Primary Examiner

U.S. Cl. X.R.

260—41, 78.5